US010834143B2

(12) United States Patent
Caldwell et al.

(10) Patent No.: US 10,834,143 B2
(45) Date of Patent: Nov. 10, 2020

(54) TELEPHONY SIGNALLING ELEMENT

(71) Applicant: Metaswitch Networks Ltd, Enfield (GB)

(72) Inventors: Andrew Caldwell, Enfield (GB); Charlie Stedman, Enfield (GB); David Reekie, Enfield (GB); Nicholas Peter Larkin, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 146 days.

(21) Appl. No.: 16/000,596

(22) Filed: Jun. 5, 2018

(65) Prior Publication Data

US 2018/0352007 A1 Dec. 6, 2018

(30) Foreign Application Priority Data

Jun. 6, 2017 (GB) .................................. 1708989.7

(51) Int. Cl.
*H04W 76/00* (2018.01)
*H04L 29/06* (2006.01)
(Continued)

(52) U.S. Cl.
CPC ...... *H04L 65/1006* (2013.01); *H04L 65/1016* (2013.01); *H04L 65/1036* (2013.01); *H04L 65/1046* (2013.01); *H04L 65/1069* (2013.01); *H04L 67/1097* (2013.01); *H04L 67/12* (2013.01); *H04L 69/40* (2013.01); *H04L 67/10* (2013.01); *H04W 76/00* (2013.01)

(58) Field of Classification Search
CPC ..... H04W 76/00; H04W 76/10; H04W 88/14; H04W 88/16; H04W 12/06; H04W 12/08; H04W 4/021; H04L 65/1006; H04L 65/1016; H04L 65/1036; H04L 65/1046; H04L 65/1069; H04L 67/1097; H04L 67/12; H04L 69/40; H04L 67/10; H04L 49/354

See application file for complete search history.

(56) References Cited

U.S. PATENT DOCUMENTS 9,892,622 B2 * 2/2018 Shaw .................. H04L 41/0681
10,419,394 B2 * 9/2019 Chou ...................... G06F 21/53
(Continued)

FOREIGN PATENT DOCUMENTS

GB         2538755 A     11/2016
WO   2017075046 A1    5/2017

OTHER PUBLICATIONS

J. Kogel, et al.; "Load Sharing in a Distributed IMS Architecture"; 2009 IEEE 69th Vehicular Technology Conference; Apr. 26-29, 2009, Barcelona, Spain, IEEE 691h.
(Continued)

*Primary Examiner* — Jean A Gelin
(74) *Attorney, Agent, or Firm* — EIP US LLP

(57) ABSTRACT

A telephony signalling element and method with a signalling processing function and a session datastore function. The signalling processing function has associated functions that are provided by one or more instantiations, and the session datastore function has associated functions that are provided by one or more instantiations. The instantiations allow for independent scalability of the functions in the telephony signalling element.

18 Claims, 2 Drawing Sheets

(51) Int. Cl.
    *H04L 29/08*    (2006.01)
    *H04L 29/14*    (2006.01)

(56) References Cited

U.S. PATENT DOCUMENTS

| | | | | |
|---|---|---|---|---|
| 2002/0064149 | A1* | 5/2002 | Elliott | H04L 47/72 |
| | | | | 370/352 |
| 2007/0198437 | A1* | 8/2007 | Eisner | H04L 29/0653 |
| | | | | 705/79 |
| 2014/0280595 | A1* | 9/2014 | Mani | H04L 67/10 |
| | | | | 709/204 |
| 2016/0057209 | A1* | 2/2016 | Parikh | H04W 88/14 |
| | | | | 709/203 |
| 2017/0026301 | A1* | 1/2017 | Keller | G06F 9/4843 |
| 2017/0060628 | A1* | 3/2017 | Tarasuk-Levin | G06F 9/45558 |
| 2017/0063674 | A1* | 3/2017 | Maskalik | H04L 47/20 |
| 2017/0201490 | A1* | 7/2017 | Kinder | H04L 63/0281 |
| 2017/0244785 | A1* | 8/2017 | Broustis | H04W 24/02 |
| 2017/0244787 | A1* | 8/2017 | Rangasamy | H04L 67/1095 |

OTHER PUBLICATIONS

G. Monteleone et al.; "Session border controller virtualization towards "service-defined" networks based on NFV and SDN"; 2013 IEEE Software Defined Networks for Future Networks and services, Nov. 11-13, 2013, Trento, Italy See figure 2 and sections 3-5.
United Kingdom Combined Search and Examination Report dated Aug. 2, 2017 on related Application No. GB 1708989.7, filed Jun. 6, 2017.
United Kingdom Examination Report dated Feb. 16, 2018 on related Application No. GB 1708989.7, filed Jun. 6, 2017.

* cited by examiner

TELEPHONY SIGNALLING ELEMENT

CROSS-REFERENCE TO RELATED APPLICATIONS

This application claims priority to United Kingdom Application No. GB 1708989.7, filed Jun. 6, 2017, under 35 U.S.C. § 119(a). This patent application is incorporated by reference in its entirety.

BACKGROUND OF THE INVENTION

Field of the Invention

The present invention relates to a telephony signalling element. In particular, but not exclusively, the present invention relates to a telephony signalling element comprising a signalling processing function and a separate session datastore function.

Description of the Related Technology

Telephony signalling elements, such as Session Border Controller (SBC) signalling elements, have traditionally used 1+1 active/standby redundancy ('High Availability (HA) pairs'). This means that 50% of the compute capacity is idle at any one time, which is wasteful.

Furthermore, in a Network Functions Virtualization (NFV) context, an HA pairs design can be problematic because it creates complex constraints on orchestrators which are required to scale the overall service one pair at a time, and which need to make sure that of a given pair, one instance is always up and running. Known systems which involve the co-location of different control plane functions related to connection termination and message processing have inefficient resource allocation.

An N-way redundancy model (also known as 'active/active' or 'N-to-N') avoids issues related to 1+1 active/standby. It means that a service is implemented on multiple instances, all of which are handling a subset of the overall traffic. If an instance fails, the work it was handling upon failure is relocated to other instances in the cluster. A fraction of the capacity of each instance can be kept unallocated for use in the case of failure (rather than for example concentrating all the spare capacity in a single standby instance).

Some known systems decompose an SBC into signalling and media elements.

Some known systems deploy a Session Initiation protocol (SIP) load balancer in front of a pool of SIP signalling elements. However, such systems do not address the efficiency points outlined above.

It would therefore be desirable to provide improved telephony signalling element designs, particularly as telcos embrace NFV.

SUMMARY

According to a first aspect of the present invention, there is provided a telephony signalling element comprising: a signalling processing function comprising: one or more instantiations of a transaction handling function; one or more instantiations of an admission control function; and one or more instantiations of an access control function; and a session datastore function comprising: one or more instantiations of a registration data store; and one or more instantiations of a dialog data store, wherein instantiations of the signalling processing function are separate from instantiations of the session datastore function.

According to a second aspect of the present invention, there is provided a method of operating a telephony signalling element, the method comprising: providing a signalling processing function comprising: one or more instantiations of a transaction handling function; one or more instantiations of an admission control function; and one or more instantiations of an access control function; and providing a session datastore function comprising: one or more instantiations of a registration data store; and one or more instantiations of a dialog data store, wherein instantiations of the signalling processing function are instantiated separately from instantiations of the session datastore function.

According to a third aspect of the present invention, there is provided a computer program comprising a set of instructions, which, when executed by a computerised device, cause the computerised device to perform a method of operating a telephony signalling element, the method comprising: providing a signalling processing function comprising: one or more instantiations of a transaction handling function; one or more instantiations of an admission control function; and one or more instantiations of an access control function; and providing a session datastore function comprising: one or more instantiations of a registration data store; and one or more instantiations of a dialog data store, wherein instantiations of the signalling processing function are instantiated separately from instantiations of the session datastore function.

Embodiments comprise a non-transitory computer-readable storage medium comprising computer-executable instructions which, when executed by a processor, cause a computing device to perform a method of operating a telephony signalling element.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Embodiments involve functional decomposition within a telephony signalling element, where each of the functions may be multiply instantiated.

In a Network Function Virtualization (NFV) context, an instance or instantiation corresponds to a virtual instance or virtual instantiation of a network function. A network function that has been virtualized is known as a Virtual Network Function (VNF) which can be instantiated one or more times in a system.

Embodiments provide a valuable way of splitting up a telephony signalling element for finer grained scaling. This provides many benefits including, but not limited to: elastic scaling based on relevant factors such as recent and anticipated load, anti-affinity to maximize hardware efficiency, and better geographic coverage. Function instances may use any information routing protocol, such as Internet Protocol (IP)-based messaging to communicate with each other. In some embodiments, some or all of the messaging is encrypted.

Embodiments described herein enable a telephony signalling element such as a SIP back-to-back user agent (B2BUA) or proxy that is dialog or call stateful. Embodiments are particularly suited for SBCs in that they include security, admission control and registration functions associated with securing a Voice over Internet Protocol (VoIP) network border.

The telephony signalling element of embodiments may for example comprise a Session Border Controller (SBC). The telephony signalling element of embodiments may for example comprise one or more of an Internet Protocol Multimedia Subsystem Proxy-Call Session Control Function (IMSP-CSCF), an Interconnection Border Control Function (IBCF), an Emergency-Call Session Control Function (E-CSCF), an access Session Border Controller (SBC), an interconnect SBC, a peering SBC, a trunking SBC, a Session Initiation Protocol (SIP) edge proxy, a SIP Back (B2BUA) and an Internet Protocol version 4 (IPv4)-Internet Protocol version 6 (IPv6) interworking SBC.

Embodiments comprise measures, including, methods, apparatus and computer programs, for use in relation to provision of a telephony signalling element and/or telephony signalling services in a telecommunications network.

Figure 1:
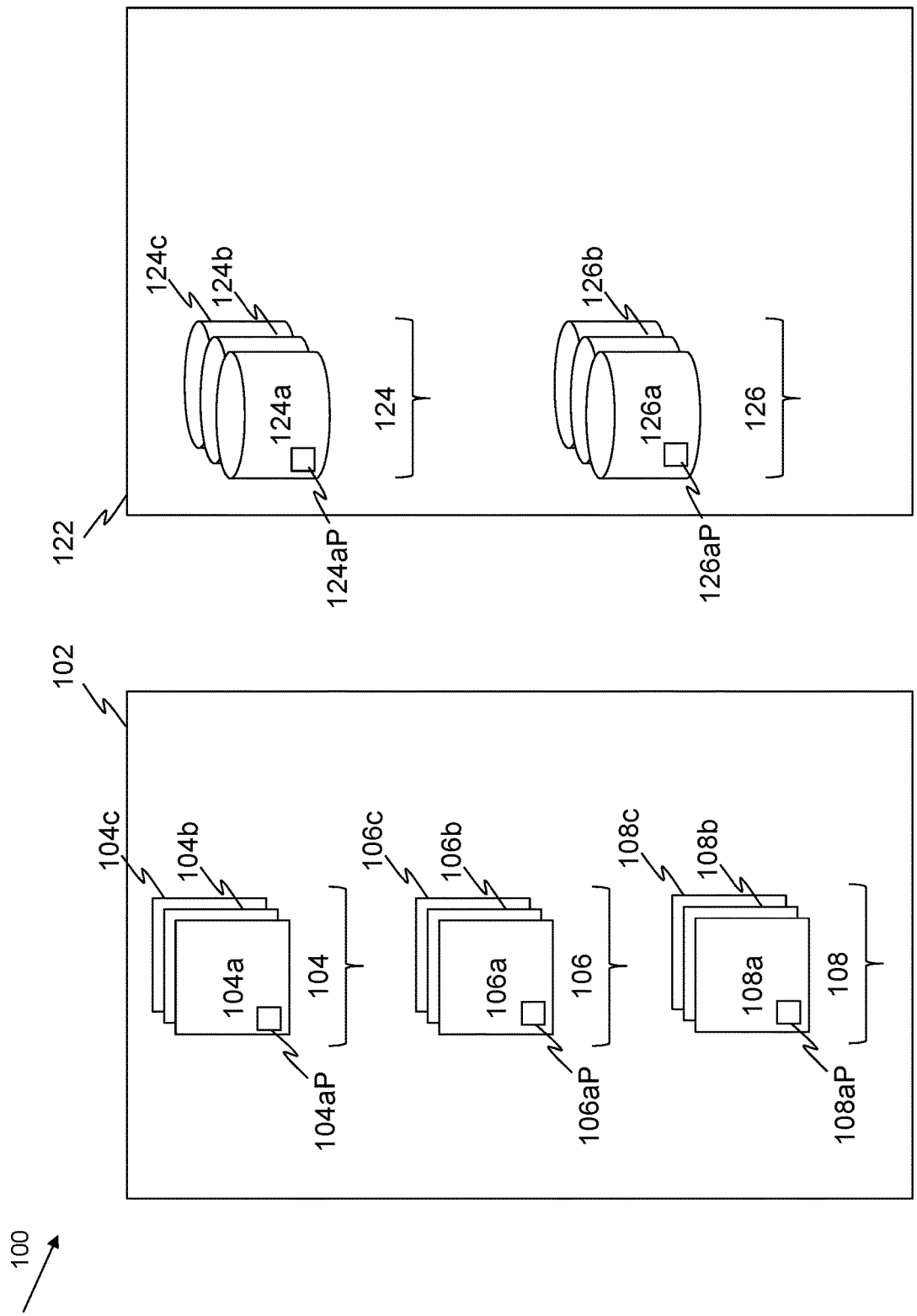
FIG. 1 shows a schematic diagram of a telephony signalling element 100 according to embodiments.

FIG. 1 shows a schematic diagram of a telephony signalling element 100 according to embodiments. In embodiments, telephony signalling element 100 comprises a signalling processing function 102 and a session datastore function 122.

The signalling processing function 102 comprises one or more instantiations of a transaction handling function 104 (in this case, instantiation 104a, instantiation 104b and instantiation 104c), one or more instantiations of an admission control function 106 (in this case, instantiation 106a, instantiation 106b and instantiation 16c), and one or more instantiations of an access control function 108 (in this case, instantiation 108a, instantiation 108b and instantiation 108c). In embodiments, each instantiation has a processor (labelled 10xxP in FIG. 1) for providing various data processing tasks according to embodiments. Instantiations within signalling processing function 102 are able to communicate with each other via one or more interfaces and/or communication links (not shown), possibly via one or more communication networks or parts thereof (not shown).

In embodiments, the number of instantiations of transaction handling function 104, admission control function 106, and access control function 108 in signalling processing function 102 are independently scalable of each other. In embodiments, the number of instantiations for any one of the functions 104, 106, 108 is independent of the number of instantiations of the other functions, which results in independent scalability of the three functions in the signalling processing function 102.

The session datastore function 122 comprises one or more instantiations of a registration data store 124 (in this case, instantiation 124a, instantiation 124b and instantiation 124c), and one or more instantiations of a dialog data store 126 (in this case, instantiation 126a, instantiation 126b and instantiation 126c). Instantiations within session datastore function 122 are able to communicate with each other via one or more interfaces and/or communication links (not shown), possibly via one or more communication networks or parts thereof (not shown).

In embodiments, the number of instantiations of registration data store 124 and dialog data store 126 in session datastore function 122 are independently scalable of each other. In embodiments, the number of instantiations for the registration data store 124 is independent of the number of instantiations of the dialog data store 126, which results in independent scalability of the two functions in the session datastore function 122.

Instantiations of signalling processing function 102 are separate from instantiations of session datastore function 122. Instantiations within signalling processing function 102 are able to communicate with instantiations within session datastore function 122 via one or more interfaces and/or data links (not shown), possibly via one or more communication networks or parts thereof (not shown).

In embodiments, instantiations in signalling processing function 102 are independently scalable of instantiations in session datastore function 122. In embodiments, the number of instantiations in the signalling processing function 102 is independent of the number of instantiations in the session datastore function 122, which results in independent scalability of the signalling processing function 102 and the session datastore function 122.

In embodiments, at least one of the instantiations 104a, 104b, 104c, 106a, 106b, 106c, 108a, 108b, 108c of signalling processing function 102 is virtually separate from one or more instantiations 124a, 124b, 124c, 126a, 126b, 126c of session datastore function 122.

In embodiments, the instantiations 104a, 104b, 104c, 106a, 106b, 106c, 108a, 108b, 108c of signalling processing function 102 are virtually separate from each other, and the instantiations 124a, 124b, 124c, 126a, 126b, 126c of session datastore function 122 are virtually separate from each other.

According to some embodiments, at least one of the instantiations 104a, 104b, 104c, 106a, 106b, 106c, 108a, 108b, 108c of signalling processing function 102 is physically separate from one or more instantiations 124a, 124b, 124c, 126a, 126b, 126c of session datastore function 122.

According to some embodiments, at least one of the instantiations 104a, 104b, 104c, 106a, 106b, 106c, 108a, 108b, 108c of signalling processing function 102 is comprised in a separate datacentre from a datacentre in which one or more instantiations 124a, 124b, 124c, 126a, 126b, 126c of session datastore function 122 are comprised in.

Figure 2:
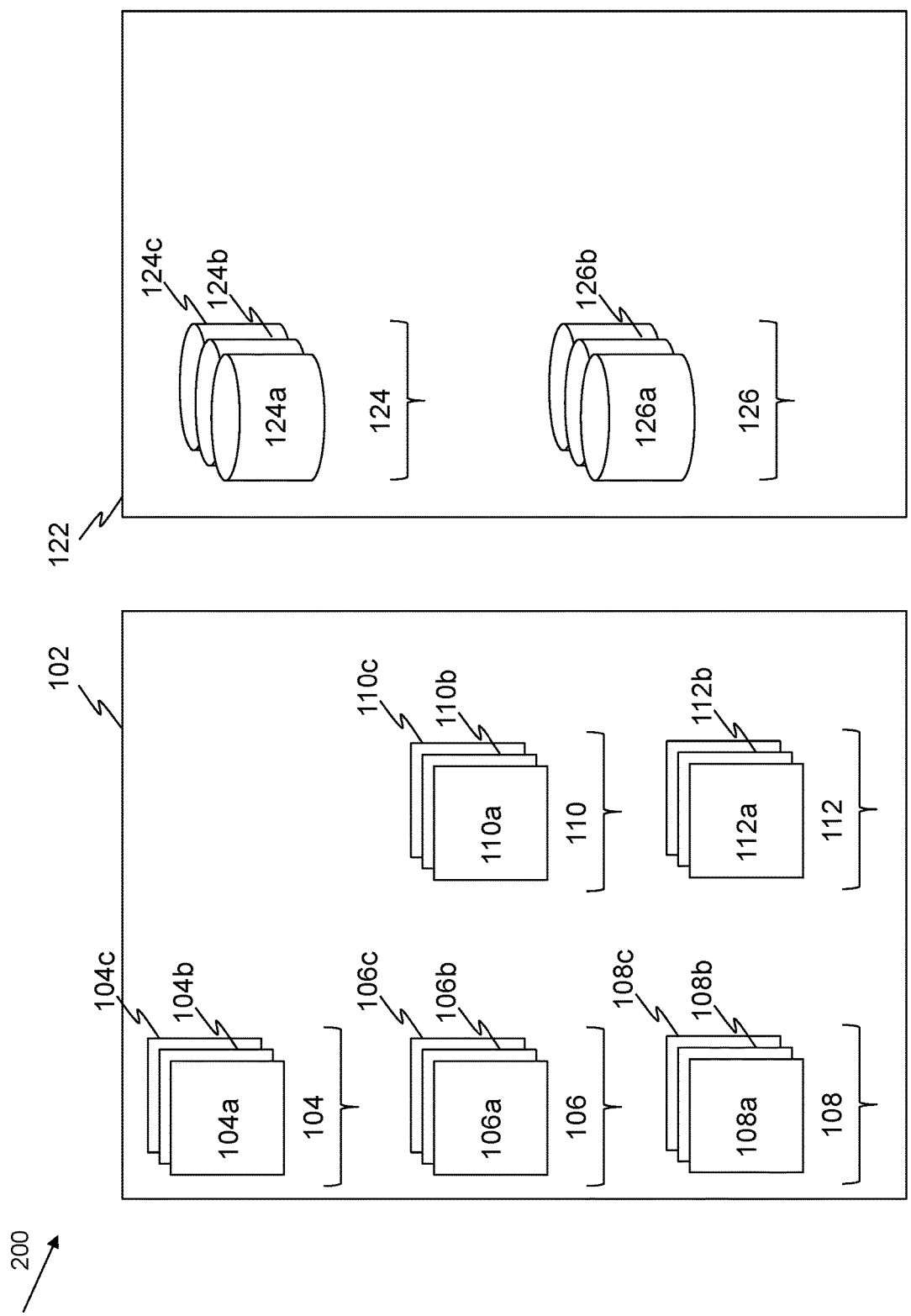
FIG. 2 shows a schematic diagram of a telephony signalling element 200 according to embodiments.

FIG. 2 shows a schematic diagram of a telephony signalling element 200 according to embodiments. Telephony signalling element 200 comprises a number of components in common with telephony signalling element 100, where common components are similarly labelled. Processors (labelled 10xxP in FIG. 1) are similarly comprised in the respective instantiations, but have been omitted in FIG. 2 for clarity purposes.

In embodiments, signalling processing function 102 of telephony signalling element 200 comprises one or more instantiations of a media session control function 110 (in this case, instantiation 110a, instantiation 110b and instantiation 110c). In embodiments, media session control function instantiations 110a, 110b, 110c are configured to manage media sessions.

In embodiments, signalling processing function 102 of telephony signalling element 200 comprises one or more instantiations of a connection termination function 112 (in this case, instantiation 112a, instantiation 112b and instantiation 112c).

In embodiments, transaction handling function instantiations 104a, 104b, 104c are configured to process signalling message transactions to completion.

In embodiments, transaction handling function instantiations 104a, 104b, 104c are configured to access services of one or more of connection termination function instantiations 112a, 112b, 112c, admission control function instantiations 106a, 106b, 106c, media session control function instantiations 110a, 110b, 110c, access control function instantiations 108a, 108b, 108c, registration data store instantiations 124a, 124b, 124c, and dialog data store instantiations 126a, 126b, 126c.

In embodiments, connection termination function instantiations 112a, 112b, 112c are configured to terminate Layer 4 associations between the telephony signalling element and external peers. The notation 'Layer 4' here refers to the transport layer of the Open Systems Interconnection model (OSI model). In some such embodiments, one or more of the Layer 4 associations are secured by Transport Layer Security (TLS) or Internet Protocol Security (IPsec).

In embodiments, connection termination function instantiations 112a, 112b, 112c are configured to perform reassembly of fragmented signalling messages.

In some embodiments, connection termination function instantiations 112a, 112b, 112c are configured to load balance requests to transaction handling instantiations 104a, 104b, 104c.

In other embodiments, connection termination function instantiations 112a, 112b, 112c are configured to deliver requests to a message queue (or 'queuing service'). In some such embodiments, transaction handling instantiations 104a, 104b, 104c are configured to pull work from the message queue. Transaction handling function instantiations 104a, 104b, 104c may be configured to employ a locking service to lock work pulled from the message queue.

In embodiments, access control function instantiations 108a, 108b, 108c are configured to manage one or more access control lists associated with the telephony signalling element.

In embodiments, access control function instantiations 108a, 108b, 108c are configured to detect suspect behaviour associated with the telephony signalling element. Suspect behaviour may relate to theft of service or denial of service. One example of suspect behaviour is attempts to use invalid registrations. Another example of suspect behaviour is sending invalid signalling messages with the intention of causing errors or overload to the system.

In embodiments, admission control function instantiations 106a, 106b, 106c are configured to authorise and rate limit requests based on policy. In some embodiments, admission control function instantiations 106a, 106b, 106c are used by transaction handling function instantiations 104a, 104b, 104c to determine whether new SIP requests are in breach of a policy limit.

In embodiments, registration datastore 124 comprises a distributed highly available datastore holding all subscriber registration session state that is being managed by the service (by the telephony signalling element). In embodiments, instantiations of the registration data store comprise a distributed data store in which subscriber registration session state data is stored. In embodiments, each item of data is stored redundantly, for example, data is replicated across multiple instances of the session store component. In embodiments, each item of data stored in an instantiation of the registration data store is replicated across other instantiations of the registration data store. In embodiments, a key sharding mechanism is employed to enable horizontal scaling. In embodiments, instantiations of the registration data store are configured to employ key sharding. In embodiments, instantiations of the registration data store are configured to employ registration timer services which call back respective transaction handling instantiations when associated registration timers pop. Some such embodiments may employ IMS Authentication and Key Agreement (AKA) session keys In embodiments, dialog datastore 126 comprises a distributed highly available datastore holding all dialog and call state that is being managed by the service (by the telephony signalling element). In embodiments, instantiations of dialog data store 126 comprise a distributed data store in which dialog and call state data is stored. In embodiments, instantiations of the dialog data store are configured to employ dialog timer services which call back respective transaction handling instantiations when associated dialog timers pop. In embodiments, each item of data stored in an instantiation of the dialog data store is replicated across other instantiations of the dialog data store.

Separating out the storage of state into the session data store 122 (i.e. separate from the signalling processing function 102) according to embodiments allows any other element to handle flows in a "stateless" way—i.e. they do not rely on having all necessary state pre-loaded themselves. This gives all the benefits of multiple instantiation, as well as the ability to seamlessly recover from element failure (since no state is lost, another instance can take over).

Embodiments comprise two methods of passing messages such as SIP signalling messages from connection termination function 112 to transaction handling function 104.

In some embodiments, instances of connection termination function 112 forward messages (such as SIP signalling messages) directly to instances of transaction handling function 104 using a sticky load balancing mechanism to ensure that a single transaction handling instance handles a single transaction/dialog/registration.

In other embodiments, instances of connection termination function 112 store messages (such as SIP signalling messages) in a network message queue. Instances of transaction handling function 104 then independently pull work from the message queue.

In terms of synchronisation between instances of transaction handling function 104 when a network message queue is in use, it may be possible for two or more transaction handling instances to de-queue duplicate requests. In embodiments, transaction handling function 104 uses a locking service or similar distributed consensus approach to lock the transaction ID that it is working on. Upon failure to obtain the lock, a transaction handling instance knows it has received a duplicate and drops it. In some such embodiments, locks expire automatically after a certain amount of time.

It may be possible for two or more transaction handling instances to receive different requests that act on the same dialog or registration. In some embodiments, dialog and/or registration work is serialised by maintaining a distinct logical queue in the queueing service per dialog and per registration.

In order to facilitate communications between and manageability of the various components described, some additional components may also be used. In embodiments, telephony signalling element 100 or 200 comprises one or more of one or more instantiations of a service discovery function, one or more instantiations of a diagnostics collection function, one or more instantiations of a monitoring function, one or more instantiations of a virtualised network function (VNF) manager, one or more instantiations of an orchestrator, one or more instantiations of a load balancer, one or more instantiations of a licensing service, one or more instantiations of a denial of service (DoS) protection function, one or more instantiations of a packet filtering function, one or more instantiations of a user management function, one or more instantiations of an authentication, authorisation, and accounting function, and one or more instantiations of a network probe function. In some embodiments, telephony signalling element 100 or 200 comprises one or more operations, administration, maintenance, provisioning, and troubleshooting (OAMPT) components.

Embodiments enable an N-way redundancy model, and independent scaling of sub-functions making up a signalling element such as an SBC signalling element.

One or more of the aspects of the embodiments described herein with reference to the drawings comprise processes performed by one or more entities such as network nodes, switches, servers, etc. In embodiments, the one or more entities comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples of the invention. Further embodiments of the invention are envisaged.

Various embodiments are described herein in relation to SIP. Embodiments are not limited to use in relation to SIP and may equally be employed in relation to multimedia communications protocols with analogous concepts, for example H.323.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A telephony signalling element comprising:
a signalling processing function comprising:
instantiations of a transaction handling function;
instantiations of an admission control function; and
instantiations of an access control function;
and a session datastore function comprising:
instantiations of a registration data store, wherein instantiations of the registration data store comprise a distributed data store in which subscriber registration session state data is stored; and
one or more instantiations of a dialog data store, wherein the instantiations of the dialog data store comprise a distributed data store in which dialog and call state data is stored,
wherein instantiations of the signalling processing function are separate from instantiations of the session datastore function, and wherein instantiations of the signalling processing function are able to communicate with instantiations of the session datastore function via one or more interfaces.

2. A telephony signalling element according to claim 1, wherein the number of instantiations of the transaction handling function, admission control function, and access control function in the signalling processing function are independently scalable of each other.

3. A telephony signalling element according to claim 1, wherein the number of instantiations of the registration data store and dialog data store in the session datastore function are independently scalable of each other.

4. A telephony signalling element according to claim 1, wherein instantiations in the signalling processing function are independently scalable of instantiations in the session datastore function.

5. A telephony signalling element according to claim 1, wherein at least one of the instantiations of the signalling processing function is physically separate from one or more instantiations of the session datastore function.

6. A telephony signalling element according to claim 1, wherein the signalling processing function comprises one or more instantiations of a media session control function.

7. A telephony signalling element according to claim 1, wherein the signalling processing function comprises one or more instantiations of a connection termination function.

8. A telephony signalling element according to claim 1, wherein transaction handling function instantiations are configured to process signalling message transactions to completion.

9. A telephony signalling element according to claim 1, wherein transaction handling function instantiations are configured to access services of one or more of:
connection termination function instantiations,
admission control function instantiations,
media session control function instantiations,
access control function instantiations,
registration data store instantiations, and
dialog data store instantiations.

10. A telephony signalling element according to claim 1, wherein admission control function instantiations are configured to authorise and rate limit requests based on policy.

11. A telephony signalling element according to claim 1, wherein access control function instantiations are configured to manage one or more access control lists associated with the telephony signalling element.

12. A telephony signalling element according to claim 1, wherein each item of data stored in an instantiation of the registration data store is replicated across other instantiations of the registration data store.

13. A telephony signalling element according to claim 1, wherein each item of data stored in an instantiation of the dialog data store is replicated across other instantiations of the dialog data store.

14. A telephony signalling element according to claim 1, comprising one or more of:
one or more instantiations of a service discovery function,
one or more instantiations of a diagnostics collection function,
one or more instantiations of a monitoring function,
one or more instantiations of a virtualised network function (VNF) manager,
one or more instantiations of an orchestrator,
one or more instantiations of a load balancer, one or more instantiations of a licensing service,
one or more instantiations of a denial of service (DoS) protection function,
one or more instantiations of a packet filtering function,
one or more instantiations of a user management function,
one or more instantiations of an authentication, authorisation, and accounting function, and
one or more instantiations of a network probe function.

15. A telephony signalling element according to claim 1, wherein the telephony signalling element comprises a Session Border Controller (SBC).

16. A telephony signalling element according to claim 1, wherein the telephony signalling element comprises one or more of:
an Internet Protocol Multimedia Subsystem Proxy-Call Session Control Function (IMS P-CSCF),
an Interconnection Border Control Function (IBCF),
an Emergency-Call Session Control Function (E-CSCF),
an access Session Border Controller (SBC),
an interconnect SBC,
a peering SBC,
a trunking SBC,
a Session Initiation Protocol (SIP) edge proxy,
a SIP Back (B2BUA) and
an Internet Protocol version 4 (IPv4)-Internet Protocol version 6 (IPv6) interworking SBC.

17. A method of operating a telephony signalling element, the method comprising:
providing a signalling processing function comprising:
instantiations of a transaction handling function;
instantiations of an admission control function; and
instantiations of an access control function;
and providing a session datastore function comprising:
instantiations of a registration data store, wherein instantiations of the registration data store comprise a distributed data store in which subscriber registration session state data is stored; and
instantiations of a dialog data store, wherein the instantiations of the dialog data store comprise a distributed data store in which dialog and call state data is stored,
wherein instantiations of the signalling processing function are instantiated separately from instantiations of the session datastore function, and wherein instantiations of the signalling processing function are able to communicate with instantiations of the session datastore function via one or more interfaces.

18. A computer program comprising a set of non-transitory instructions, which, when executed by a computerised device, cause the computerised device to perform a method of operating a telephony signalling element, the method comprising:
providing a signalling processing function comprising:
instantiations of a transaction handling function;
instantiations of an admission control function; and
instantiations of an access control function;
and providing a session datastore function comprising:
instantiations of a registration data store, wherein instantiations of the registration data store comprise a distributed data store in which subscriber registration session state data is stored; and
instantiations of a dialog data store, wherein the instantiations of the dialog data store comprise a distributed data store in which dialog and call state data is stored,
wherein instantiations of the signalling processing function are instantiated separately from instantiations of the session datastore function, and wherein instantiations of the signalling processing function are able to communicate with instantiations of the session datastore function via one or more interfaces.

* * * * *